SYNCHRONIZING SIGNAL SEPARATION

Filed May 5, 1954

INVENTOR.
RICHARD W. SONNENFELDT
BY
ATTORNEY

United States Patent Office 2,923,766

Patented Feb. 2, 1960

2,923,766

SYNCHRONIZING SIGNAL SEPARATION

Richard W. Sonnenfeldt, Haddonfield, N.J., assignor to Radio Corporation of America, a corporation of Delaware Application May 5, 1954, Serial No. 427,754

2 Claims. (Cl. 178—5.4)

This invention relates to apparatus for the separation of signals from a wave and more particularly, to the separation of the color synchronizing signal from the color television signal in color television receivers.

According to the color television standards approved for United States broadcast by the Federal Communications Commission on December 17, 1953, and released as FCC Public Notice No. 53-1663, a burst of a reference frequency, which is the frequency of the color subcarrier, is positioned on the back porch of the horizontal blanking signal. Each cycle of the burst swings approximately symmetrically above and below the back porch level. The burst is transmitted so that the phase of the color demodulating oscillator in the color receiver is maintained in synchronism with the phase of the subcarrier which has been modulated at the transmitter with color information. If the phase of the local oscillator should fall out of synchronism appropriate phase detecting apparatus resets the local oscillator in response to a generated voltage by means such as conventional reactance tube frequency control. Failure to achieve exact synchronism results in unpleasant images on the viewing screen of the receiver because of improper color rendition.

In order to provide the phase detector or other comparison devices with the synchronizing information, the burst must be separated from the incoming signal. Sometimes this separation of the burst is accomplished by filtering out from the input composite video signal those frequencies in the neighborhood of the color subcarrier which is 3.579545 mc. This filtered signal may be applied to a coincidence circuit to which a keying or a gating pulse is applied at the time when the burst from the filter circuit is applied. Often the keying pulse is derived from the horizontal deflection circuit. For example, the horizontal flyback signal may trigger a generator for producing the keying pulses, or may itself be shaped for this purpose. Since it is desirable to extract as much of the burst signal as possible to provide an adequate input to the phase comparison device the keying pulse is made broad enough so that if there is any time variation between successive bursts or successive gating pulses there will be sufficient overlap of the gating pulse on either side of the burst to permit all of the burst cycles to be gated out. A concomitant disadvantage of such a broad pulse is the fact that noise may be permitted to pass through the coincidence circuit in the interval of the overlap. Another disadvantage is that the keying pulses will always generate components in the vicinity of the burst frequency itself since it must drive the tube beyond cutoff. Therefore, if the filtered wave containing the burst is applied continuously to the coincidence circuit, and the coincidence circuit conducts when the gating pulse is applied, the frequency components of the gating pulse in the region of the burst frequency cause transients to appear in the output circuit of the coincidence circuit; this circuit usually containing a circuit resonant to the burst frequency. These transients appear as damped wave trains following the leading and trailing edges of the gate. These transients cause inaccuracies and malfunction of the phase detector circuit which may cause the local oscillator output wave to lose the proper relation to the incoming subcarrier.

According to this invention transients due to the application of the high frequency components of the gating pulse upon the output resonant circuit are prevented from occurring. This is accomplished by not only time selecting the interval during which burst appears in the incoming signal, but also amplitude selecting the burst portion and preventing conduction through the coincidence circuit unless both types of selection happen simultaneously. In one form of the invention an electron discharge device having two control input circuits is adapted to conduct only when the gating pulse is applied to one input circuit, while an amplitude limited portion of the burst is applied to another input circuit. At all other times, since the tube will not conduct, the high frequency components of the gating pulse cannot be transmitted through the device and thus transients cannot arise due to the excitation of the resonant circuit by the gating pulses themselves.

A principal object of this invention is to provide an improved means for separating a significant signal from a wave in which said significant signal periodically recurs.

It is a further object of this invention to provide an improved means for separating a periodically recurring synchronizing signal from a television wave.

Still another object is to provide a means for separating the burst of the color synchronizing wave from a color television wave without introducing transients by said separation.

These and other objects of the invention will become apparent from a detailed consideration of the drawings in which.

Figures 1, 2, 3, 4:
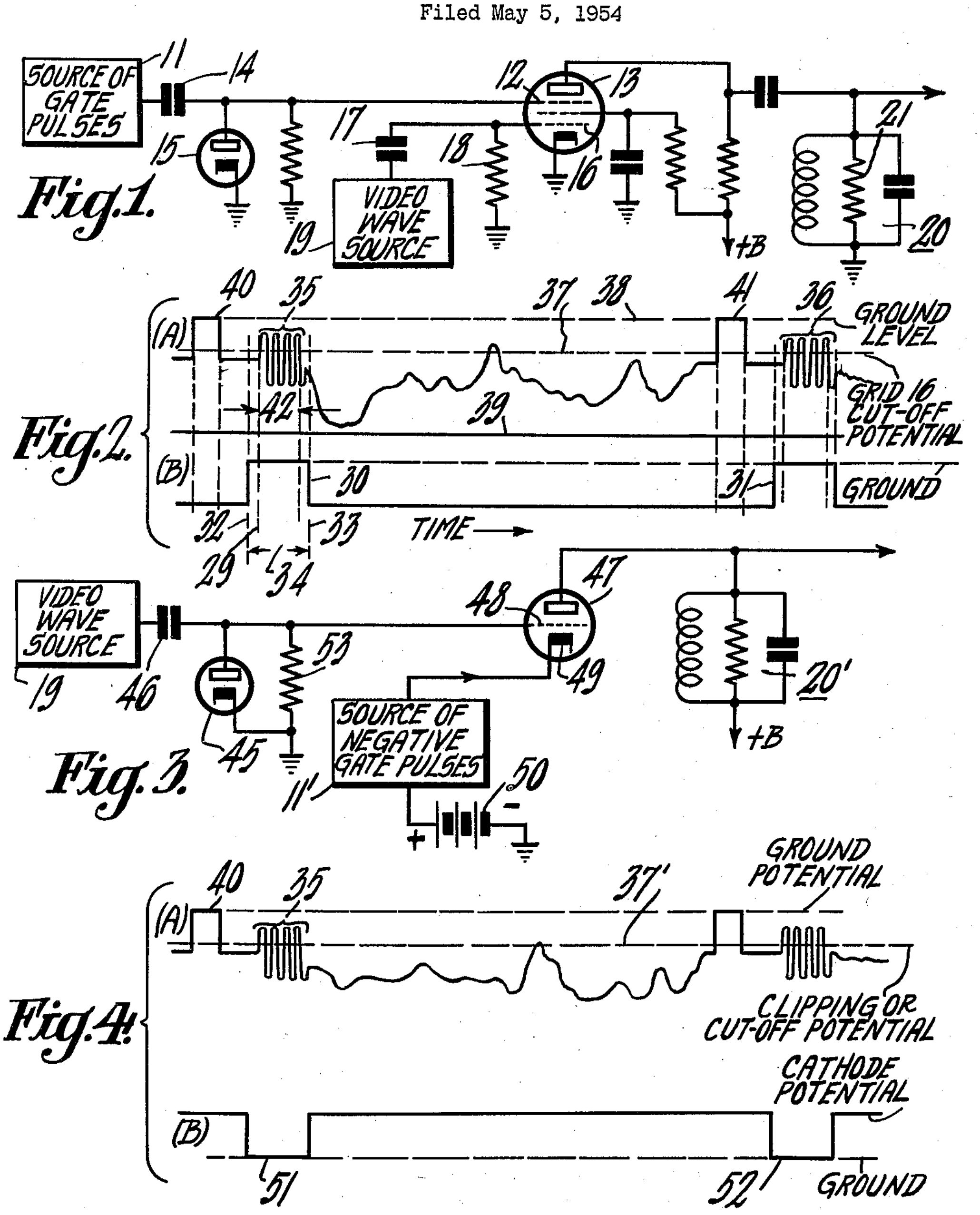
Figure 1 is a circuit diagram of one form of the present invention.
Figure 2 are curves showing the operating conditions of the apparatus of Figure 1.
Figure 3 is a circuit diagram of another form of the present invention.
Figure 4 is a group of curves showing the operating conditions of the apparatus of Figure 3.

Figure 1 is a drawing which illustrates how the invention may be used in connection with a pentode tube. A source of gate pulses 11 is coupled to the suppressor grid 12 of pentode tube 13 by way of coupling condenser 14. The gate pulses may be derived, for example, from the horizontal deflection circuit in response to the horizontal flyback pulses, either directly or indirectly. Since there generally is an automatic frequency control circuit in the horizontal deflection part of a television receiver, these gate pulses will be produced with a high degree of regularity and variations in the time of their occurrence will tend to be averaged out. Typical gate pulses 30 and 31 are shown in curve B of Figure 2. It is necessary for the purpose of this invention to set the level at which the gate pulses are applied to the pentode 13. In this case a diode 15 is coupled from the suppressor grid 12 to ground. It serves to clamp the suppressor grid 12 to cathode potential. It is also possible, however, to use instead of the clamp diode 15 a source of fixed bias.

It is to be noted in Figure 2 that the leading edge of pulse 30 occurs at a point in time marked by the vertical dashed line 32 whereas the trailing edge is marked by the vertical dashed line 33. The interval of time between the leading and trailing edges is shown as interval 34 and occurs so as to overlap by a small amount the occurrence of the burst 35 shown in curve A of Figure 2.

A wave containing the burst is supplied to control grid 16 via condenser 17. Condenser 17 and resistor 18 comprise a self-biasing circuit which is set at a level determined by the peak of the sync pulses 40 and 41. Assuming, in the first instance, that the wave from video wave source 19 is a composite video signal, the bias produced by the self-biasing circuit is such that only those portions of the incoming wave from source 19 which are above the clipping level marked by the horizontal dashed line 37 of curve A of Figure 2, which is the control grid cutoff potential, can be operative if the tube is in a conductive state.

The sync pulse 30 readies the pentode tube 13 for conduction beginning with the point in time marked by line 32. However, the tube 13 will not conduct beginning with the point in time 32 because although the suppressor grid is held to the cathode potential, the control grid 16 at time 32 is below the cutoff level indicated by horizontal line 37. The tube will only conduct when the burst cycle 35 and the gate pulse 30 simultaneously appear, i.e., during the interval 42. This means, that although the gate pulse 30 from source 11 is applied to the pentode 13 before and after the occurrence of the burst 35, the high frequency components in its leading and trailing edges in the vicinity of the resonant frequency of the parallel resonant circuit 20 will not be able to affect the latter because the tube is still cut off. In this manner transients are prevented.

The operation of Figure 1 has been explained in connection with an assumption that the wave supplied by video wave source 19 is the composite color video signal, and that the means for making grid 16 a clipper at cutoff level 37 consisted of a self-bias circuit including condenser 17 and resistor 18. It should be noted, however, that the invention is operable even if the wave supplied by video wave source 19 contains only the components of the composite color video signal which lie in the neighborhood of the burst and color subcarrier frequency, i.e., 3.58 mc. In case a band-pass filter supplies only the color portion of the signal to grid 16, the wave will not have the configuration shown by curve A of Figure 2 but instead will have spikes corresponding to the leading and trailing edges of the sync pulse 40. It will also have a plurality of subcarrier components, largely devoid of luminance information, between the end of the burst 35 and the beginning of the next sync pulse 41. Since the spikes caused by the sync pulse 40 probably would not charge up the condenser 17 sufficiently to maintain the clipping level as shown by line 37, the self-bias circuit may be supplanted by a source of fixed bias set at the clipping level 37. Otherwise the operation would be similar to that already explained when the input video wave is a complete composite color video signal.

An advantage of this invention is that for a wide variety of amplitudes of the input video wave from source 19, the tube will produce a constant output amplitude of burst. This is so because the grid 16 is always driven from cutoff to saturation in such cases. As a result the output wave is limited, and therefore additional limiting means to provide a constant input to a subsequent phase detection circuit will not be necessary.

A further advantage of this arrangement is that the value of damping resistor 21 in the resonant circuit 20 can have a larger value; since no transients due to the gating pulse are produced, it is not necessary to damp out to the same degree. With larger values of a damping resistor 21 higher gain is achieved.

It is obvious also, that since the tube is cut off at a moment before the burst is separated and a moment thereafter, the possibility of noise entering into the system is cut down.

The invention is not limited in its application to the use of a pentode but may also be applied to other electron discharge devices having a plurality of electrodes at which the gate pulse and incoming video wave can be applied.

Another example of the present invention is pictured in Figure 3. Figure 4 shows the operating conditions of the apparatus of Figure 3. Parts similar to those in the preceding figures are similarly numbered. A video wave source 19 supplies a composite color video signal via coupling condenser 46 to grid 48 to triode 47. A diode is coupled between the grid 48 and ground to clamp the top of the sync pulses to ground. This is shown more clearly in curve A of Figure 4. The cathode 49 of the triode is coupled via a source 11' of negative gate pulses to a source of fixed potential 50 which may be a battery or the equivalent. The battery is connected so that the cathode 49 is plus with respect to ground in the absence of gating pulses.

The source 11' of negative gate pulses is similar to the source 11 shown in Figure 1. It may be coupled to the horizontal deflection circuit and may include polarity inverter stages so as to provide the proper negative pulse. The pulse 51 is supplied from the source 11' to the cathode 49 at a time shortly before the burst 35 appears in the composite wave as shown in curve A of Figure 4. The tube parameters of triode 47 are adjusted so that the tube clips the incoming video wave at clipping level 37' as shown in curve A of Figure 4. Therefore, when the leading edge of negative pulse 51 is applied to the cathode, it tends to make the grid 48 more positive with respect to the cathode. However, during the interval of the sync pulse 40 and the burst 35 the tube is cut off so that the leading edge of pulse 51 readies or conditions the triode 47 for conduction. Whenever the burst 35 and the pulse 51 coincide, the cathode potential is sufficiently negative to permit the tube to pass current during the positive half-cycles of the burst 35. These positive half-cycles are applied to the tank circuit 20' which is coupled to the anode of the triode 47. The action of the resonant circuit 20' restores the amplified half-cycle to a full sine wave envelope.

In the forms of the invention shown in Figures 1 and 3 the best operation will be accomplished when the incoming video wave, whether it be a complete composite color video wave or the components in the subcarrier frequency region, is at a fairly high and constant level. In this case the clipping level 37 (Figure 2) and the clipping level 37' (Figure 4) will then operate at the portion of the input wave indicated. This will insure that the burst separation tube will be cut off slightly before and after the occurrence of burst. However, if the input video wave is considerably attenuated, the clipping level will fall below that pictured into the "white" region and hence the tube will conduct immediately before and after the burst which permits transients to occur in the output tank circuit. In the case of Figure 1 the clipping level 37 falls because the RC circuit comprising condenser 17 and resistor 18 cannot charge up to the proper self-biasing level. In the case of Figure 3 the clipping level 37' will fall because of the clipping action of the diode 45 in conjunction with the action of resistor 53 in maintaining the bias on grid 48. However, the burst separator circuit then performs in a manner similar to many other burst separation circuits which permit transients to be gated into the output circuit. When the amplitude level of the input video wave is restored to the proper level once again, the circuit performs in a manner such as to prevent the generation of transients. It is also possible to use a pentode with a grounded suppressor instead of the triode of Figure 3. Naturally, the operating characteristics of the pentode should be adjusted to maintain the clipping or cutoff potential at the proper level.

Having described the invention what is claimed is:

1. In a television receiver in which a video wave appears having a recurrent burst of a synchronizing signal, the combination including a triode having an anode, cathode, and a control grid, a diode coupled to said control grid, means for applying said video wave to said control grid, means coupled to said control grid for clipping said video wave at a predetermined level, said diode being adapted to hold the most positive portion of said video wave to a fixed level of potential, means for applying a potential to said cathode which is more positive than said fixed level, means for reducing said cathode potential at regular intervals, said intervals beginning at a time shortly before said burst occurs and ending shortly thereafter, said reduced cathode potential being adapted to permit said triode to conduct only at a time when a portion of said burst above said predetermined clipping level occurs, and a tank circuit coupled to said anode, said tank circuit being resonant at said burst frequency.

2. In a color television system including a source of a video signal having bursts of oscillations symmetrically positioned on horizontal blanking signals, means for separating the bursts from the video signal comprising, a triode vacuum tube having cathode, grid and anode electrodes, means to couple said source of video signal to said grid, a source of gate pulses each having a leading edge occurring prior to a corresponding burst and a trailing edge occurring after the corresponding burst, means to couple said source of gate pulses to said cathode, biasing means to bias said grid and cathode electrodes so that said triode is conductive solely during a portion of each half cycle of given polarity of said bursts, said biasing means including a clamping diode in circuit with said grid electrode to clamp excursions of one polarity of the signal from said source of video signal to a reference potential, and an output circuit tuned to the frequency of said bursts and coupled to said anode electrode.

References Cited in the file of this patent

UNITED STATES PATENTS

| | | |
|---|---|---|
| 2,484,352 | Miller et al. | Oct. 11, 1949 |
| 2,625,603 | Gruen et al. | Jan. 13, 1953 |
| 2,645,713 | Pritchard | July 14, 1953 |
| 2,653,187 | Luck | Sept. 22, 1953 |
| 2,712,568 | Avins et al. | July 5, 1955 |
| 2,712,570 | Polder | July 5, 1955 |
| 2,713,608 | Sonnenfeldt | July 19, 1955 |